(12) United States Patent
Wilson

(10) Patent No.: US 6,483,530 B2
(45) Date of Patent: Nov. 19, 2002

(54) CAST HONEYCOMB STRUCTURE WITH INTEGRAL DAMPING FOR ROS PLATFORM

(75) Inventor: James M. Wilson, Glendora, CA (US)

(73) Assignee: Xerox Corporation, Stamford, CT (US)

( * ) Notice: Subject to any disclaimer, the term of this patent is extended or adjusted under 35 U.S.C. 154(b) by 41 days.

(21) Appl. No.: 09/746,898

(22) Filed: Dec. 22, 2000

(65) Prior Publication Data

US 2002/0080229 A1 Jun. 27, 2002

(51) Int. Cl.$^7$ ................................................ B41J 2/435
(52) U.S. Cl. ........................................................ 347/263
(58) Field of Search ................................. 347/263, 242, 347/245, 257

(56) References Cited

U.S. PATENT DOCUMENTS

| | | | | |
|---|---|---|---|---|
| 4,404,468 A | * | 9/1983 | Kleinschmidt | 250/342 |
| H783 H | * | 6/1990 | Callender | 359/366 |
| 5,760,818 A | | 6/1998 | Hinton et al. | 347/263 |

FOREIGN PATENT DOCUMENTS

EP 983 900 * 3/2000

* cited by examiner

Primary Examiner—Michael Nghiem
(74) Attorney, Agent, or Firm—William Propp

(57) ABSTRACT

A honeycomb structure is formed integral with a raster output scanning system housing. A constrained layer damper is bonded to the honeycomb structure and the raster output scanning system is mounted on the constrained layer damper. The honeycomb structure and constrained layer damper provide support and reduce vibrations to the raster output scanning system. The cells of the honeycomb structure can be irregular in height, thickness, density or shape to further support and damp vibrations.

10 Claims, 5 Drawing Sheets

FIG. 2
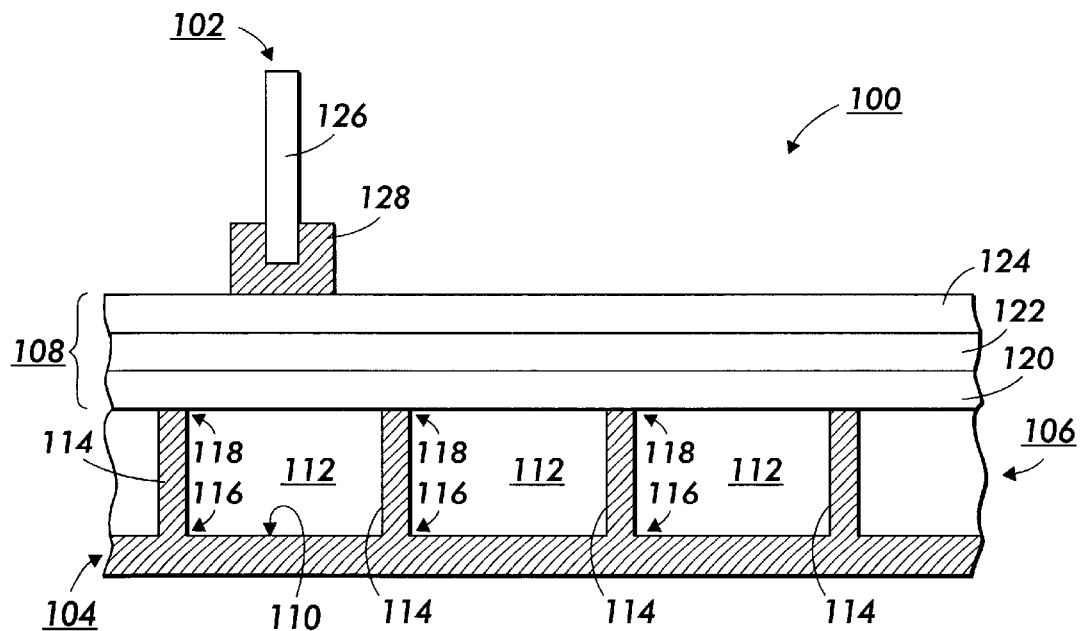
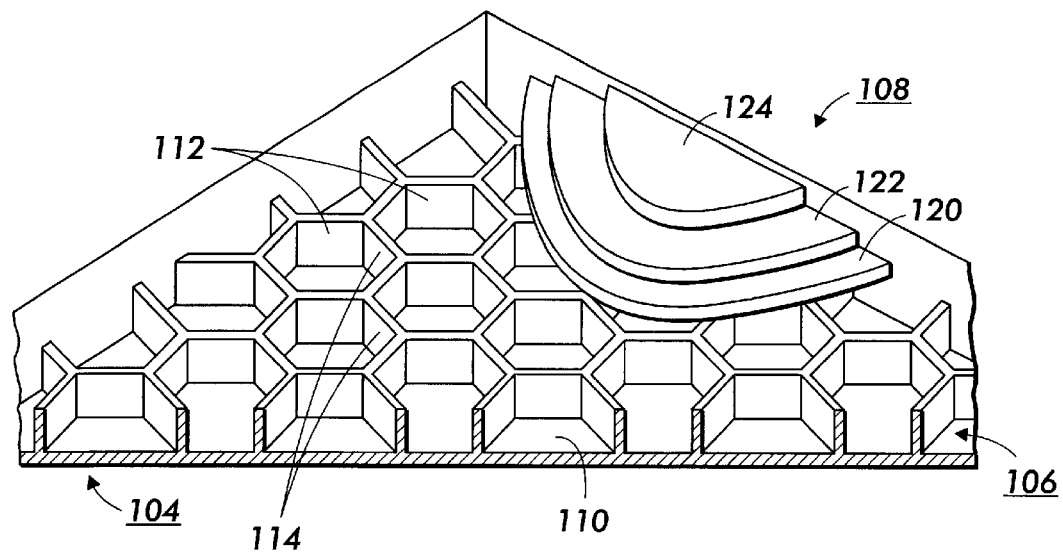
FIG. 3

CAST HONEYCOMB STRUCTURE WITH INTEGRAL DAMPING FOR ROS PLATFORM

BACKGROUND OF THE INVENTION

The present invention relates to the support platform for a raster output scanning (ROS) system and, more particularly, to a cast honeycomb structure with integral damping to support and reduce vibrations to the ROS system.

Printing systems utilizing a ROS to form images on a photoreceptor surface are well known in the art. Conventionally, the ROS includes a laser for generating a coherent beam of radiation; a modulator for modulating the laser beam in accordance with an input signal; and a multi-faceted polygon mirror for scanning the modulated laser beam line by line across the surface of a photosensitive medium to form a latent image. Also included in the ROS are various optical components to collimate, expand, focus, and align the modulated scanning beam. These optical components are fixedly mounted within a housing frame, which is positioned within a printer machine frame, so that the modulated and shaped scanning beam emerging from a window in the housing is directed along a scan line on the surface of the photosensitive medium. The scan lines will be formed in parallel in a raster pattern across the surface of the photosensitive medium.

As shown in the prior art printing system of FIG. 1, the raster output scanner 10 is positioned in the ROS housing 12 to emit a scanning beam to the exterior photosensitive medium (a photoreceptor) 14.

The raster output scanning system 10 utilizes a laser diode light source 16 to emit a modulated coherent light beam 18. The light beam 18 is collimated by a multi-element optical collimator 20. Mirrors 22 and 24 fold and redirect the light beam 18 within the housing 12. A cross-scan cylindrical lens 26 focuses the light beam 18 in the sagittal or cross scan plane onto a facet 28 of the multi-faceted polygon mirror 30 while maintaining the collimation of the scan portion of the beam. The light beam 18 thus forms a line on the facet 28. Mirror 32 folds and redirects the light beam 18 from the cylindrical lens 26 to the facet 28.

The light beam 18 is reflected from the facet 28. A motor 34 rotates the facet 28 so that the light beam will scan across the photoreceptor 14.

The light beam 18, after reflection from the facet 28, is still collimated in the scan plane and is now diverging in the cross-scan plane. The beam 18 then passes through an f-theta scan lens 36 consisting of a negative plano-spherical lens 38, a positive plano-spherical lens 40 and a cross-scan cylindrical lens 42. This f-theta scan lens configuration converges the beam 18 in the scan axis.

After passing through the f-theta scan lens 36, the light beam 18 is then reflected off a cylindrical wobble correction mirror 44. The mirror 44 is positive and cylindrical in the cross-scan plane and flat in the scan plane. Thus, the wobble mirror converges the previously diverging cross-scan portion of the light beam 18 but allows the converging cross-scan portion of the light beam 18 focused by the f-theta lens 36 to pass through unaffected. The reflected beam 18 is focussed onto a scan line 46 on the photoreceptor 14.

The housing provides physical support for the optical components of the raster output scanning system and positions the scanning system relative to the photosensitive medium. The scanning beam must be properly aligned and focused on the photosensitive medium.

A raster output scanner is usually implemented with the rotating polygon mirror as part of a motor polygon assembly. The motor polygon assembly includes not only the polygon, but also a drive motor, bearings, shafts, mounts, and, possibly, a speed control circuit for the motor. In practice, the motor polygon assembly is usually the largest and heaviest component of the raster output scanner to be supported by the housing. The lens and stationary mirrors of the raster output scanner are smaller and lightweight in comparison.

The laser, polygon mirror and motor, and the lens and mirrors of the ROS are either attached directly to the housing or, more typically, mounted on brackets which are attached directly to the housing. The housing is usually metal or a high density rigid plastic or a reinforced polycarbonate material.

Vibration always poses a problem to the positioning and focusing of the scanning beam. External vibrations can come from any number of sources including the photosensitive medium itself if the medium is a rotating photoreceptor belt. The major source of internal vibration is the rotating polygon mirror and motor.

The high speed rotation of the polygon mirror can cause vibrations which misalign or misfocus the other optical components of the raster scanner, particularly the lightweight lens and mirrors. Contrarily, the rotating polygon mirror itself is sensitive to vibrations which can misfocus or misalign the scanning beam reflected from the revolving facets.

While positioning and focusing the raster output scanner relative to the photoreceptor is difficult in black only printing, with color printing using multiple raster output scanners, proper positioning and proper focusing of the raster output scanners relative to the photoreceptor or photoreceptors becomes even more difficult.

Vibration dampers are well known. External compression springs are used to support and isolate a ROS from vibration in U.S. Pat. No. 5,760,818, commonly assigned as the present application and herein incorporated by reference. Other types of vibration dampers include attaching the ROS optical component mounts inside the housing to elastomeric materials that absorb vibration energy.

The housing for a raster optical scanner must provide a very rigid base for the ROS for meeting the extreme scanning beam position stability requirements of high performance imagers. In addition, it would be advantageous for the housing to be able to damp certain vibration modes.

It is an object of the present invention to provide a rigid housing to support the optical components of the raster output scanning system and position the scanning system relative to the photosensitive medium and to provide a housing that damps internal and external vibration modes.

It is another object of the present invention to provide a honeycomb structure housing with integral damping layers to support and reduce vibrations to the ROS system.

SUMMARY OF THE INVENTION

According to the present invention, a honeycomb structure is formed integral with a raster output scanning system housing. A constrained layer damper is bonded to the honeycomb structure and the raster output scanning system is mounted on the constrained layer damper. The honeycomb structure and constrained layer damper provide support and reduce vibrations to the raster output scanning system. The cells of the honeycomb structure can be irregular in height, thickness, density or shape to further support and damp vibrations.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 is a side view of the honeycomb support structure and constrained layer damper for the raster output scanning system housing of the present invention.

FIG. 3 is a cut-away top view of the honeycomb support structure and constrained layer damper for the raster output scanning system housing of the present invention.

DESCRIPTION OF THE INVENTION

Figure 1:
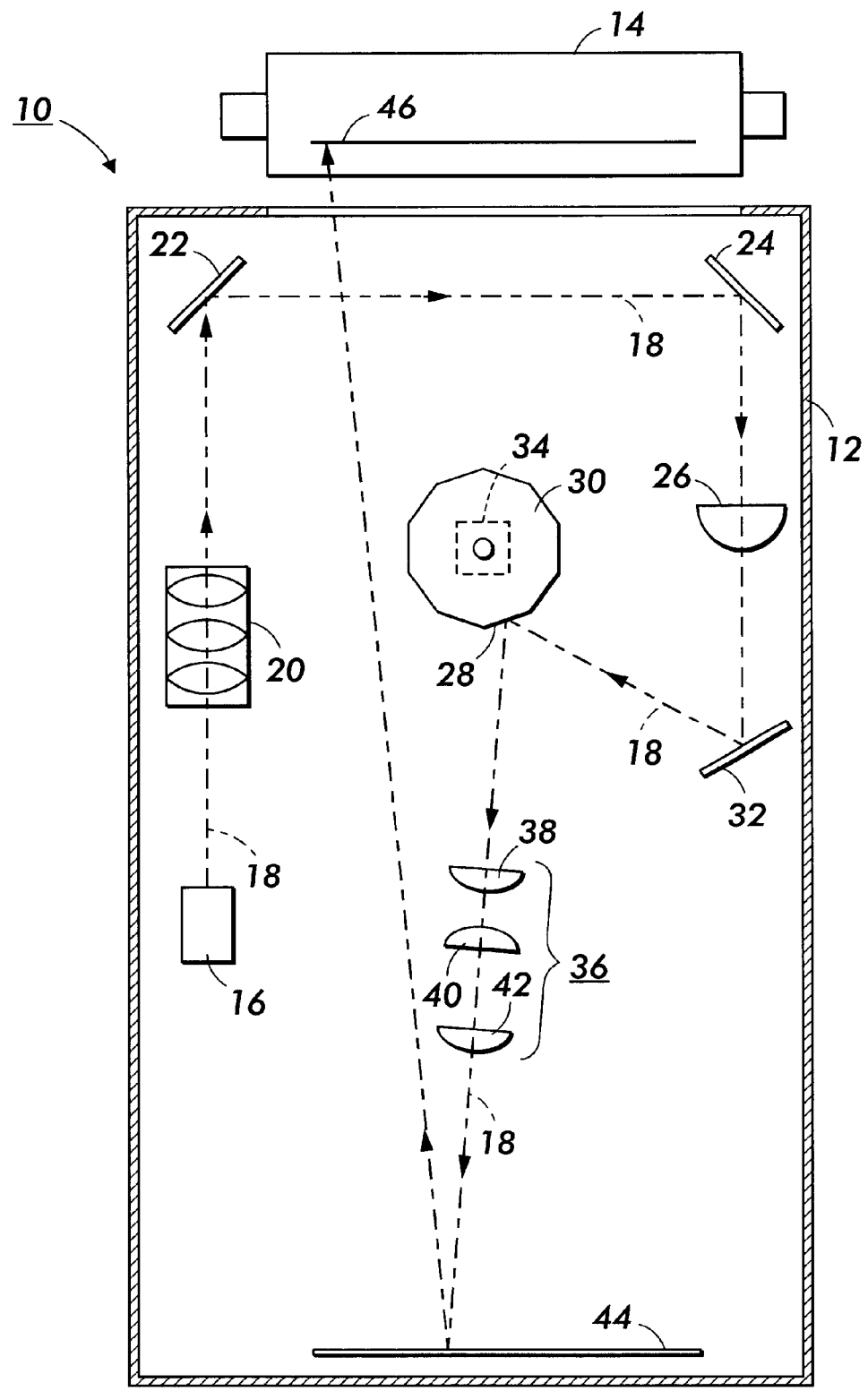
FIG. 1 is a top view of a prior art raster output scanning system within a housing.

Reference is now made to FIG. 2, wherein there is illustrated the support and vibration damping structure 100 for a raster optical scanning (ROS) system 102 in a housing 104 in accordance with this invention. The support and vibration damping structure 100 has a honeycomb support structure 106 with a constrained layer damper 108 to support and reduce vibrations to the ROS system 102.

The housing 104 for the raster optical scanning system 102 is formed of cast aluminum. The housing has a generally flat bottom surface 110 on the interior of the housing.

The honeycomb support structure 106 is also formed of cast aluminum. The honeycomb structure 106 consisting of plural, interconnected polygonal cells 112. A preferred polygon for the present invention is a hexagon, so that the honeycomb structure is defined by plural interconnected hexagons.

The individual honeycomb cells 112 are formed by plural, parallel walls 114 of substantially uniform thickness. The walls 114 of the honeycomb cells are perpendicular to the bottom surface 110 of the housing 104 and to the constrained layer damping structure 108.

The cellular structure of the honeycomb support structure reduces the weight of the support means of the ROS while still maintaining the necessary physical support strength for the weight of the ROS.

In the present invention, the honeycomb support structure 106 is formed integral with the housing 104 by metal casting. Both the honeycomb structure and the housing are cast from aluminum. Casting methods for making the metal honeycomb structure and metal housing are known to those of ordinary skill in the art. Existing casting techniques include die casting, investment casting, and sand casting.

Typically a honeycomb structure will have two major opposing surfaces, a base plate and a top plate. The base and top plates are parallel and extend perpendicular to the cells. The base and top plates cover the bottom edge 116 and the top edge 118 respectively of the walls 114 of the plural, hexagonal cells 112. The base and top plates close off the open ends of the cells. In the present invention, the interior bottom surface 110 of the housing 104 is the base plate for the cells 112 of the honeycomb support structure 106 since the honeycomb structure and the housing were cast integral.

The constrained layer damper 108 is bonded to the top edge 118 of the cells 112 of the honeycomb support structure 106. The constrained layer damper 108 consists of a structural layer 120 of aluminum, a thin viscoelastic polymer layer 122 and a constrained layer 124 of aluminum. The three layers 120, 122 and 124 of the constrained layer damper 108 can be bonded together or alternatively the viscoelastic material of layer 122 can be adhesive so that the adjacent structural layers 120 and 124 will adhere to the viscoelastic layer.

The aluminum structural layer 120 of the constrained layer damper 108 is bonded to the top edge 118 of the cells 112 of the honeycomb support structure 106. The structural layer of the constrained layer damper is the top plate of the honeycomb structure.

The raster optical scanning (ROS) system 102 is mounted on the constrained layer 124 of the constrained layer damper 108. As shown as an illustrative example in the FIG., a lens 126 of the ROS 102 is held in position by a bracket 128 secured to the constrained layer 124.

Vibration is damped by the constrained layer damper by the difference in stiffnesses between the structural aluminum layers 120 and 124 and the flexible viscoelastic layer 122 creates significant shear in the viscoelastic layer. Vibrational motion of either the structural layer 120 or the constrained layer 124 subjects the viscoelastic layer 122 in between to tension-compression deformation which dissipates the vibrational energy.

Whether the vibration came from the structural layer 120 below or the constrained layer 124 above, by dissipating the energy the viscoelastic layer 122 keeps the vibration from effecting the optical components of the raster output scanning system 102 mounted on the constrained layer 124.

Viscoelastic layers are by definition attempting to minimize the negative effects of vibration after they already exist within the component or device, instead of preventing or precluding them from entering the device at the outset. The constrained layer damper diminishes the external vibrations resonating through the honeycomb supports structure from effecting the raster output scanning system mounted on the damper. The constrained layer damper also diminishes the internal vibrations from the rotating polygon mirror and the motor which are mounted on the damper from effecting the other optical components of the raster output scanning system which are also mounted on the damper.

The viscoelastic layer 122 is typically thinner in thickness than the surrounding metal structural layers 120 and 124. The thickness of the viscoelastic layer varies depending upon the frequency range of the vibration to be suppressed and the viscoelastic material.

The viscoelastic damping material can be any plastically deformable fluid having a finite fluidity such as rubber, silicone rubber, synthetic rubber, e.g., neoprene, or any polymer having such properties.

While only a single viscoelastic material and two structural material layers are illustrated in FIG. 2 for the constrained layer damper, in many instances, several alternating layers of layers of viscoelastic material and structural material can be bonded on top of each other to provide a multiple layer constrained layer damper that provides the requisite amount of vibration damping.

As used herein, "honeycomb" refers to the plural, interconnected polygonal cells 112 that project upwardly from the base 110 as shown in FIGS. 2 and 3. The polygon may be any of a number of shapes, including, without limitation, triangles, squares, pentagons, hexagons, heptagons, octagons, nonagons, decagons, and even circles.

Figure 4:
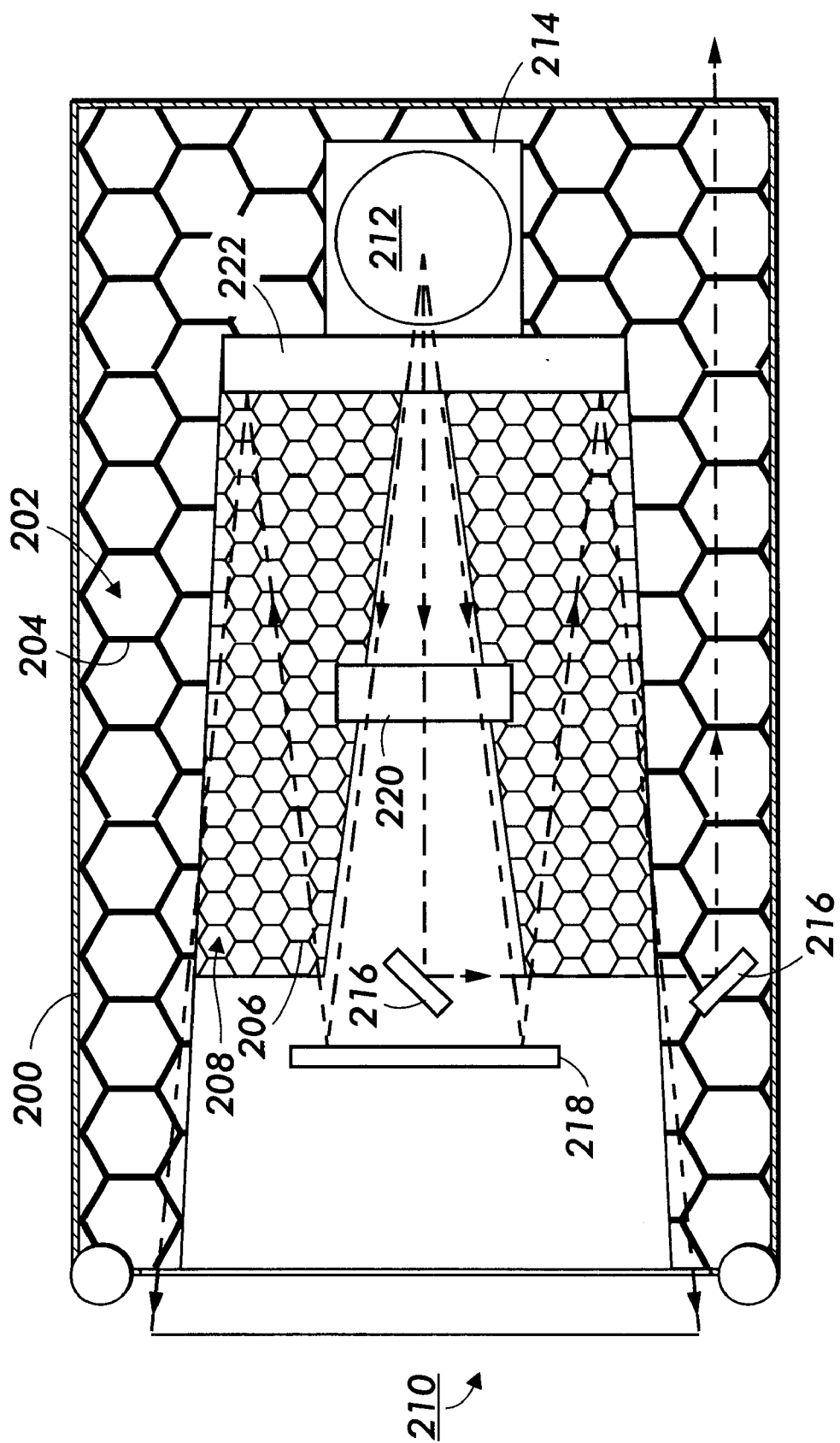
FIG. 4 is a top view of a honeycomb support structure with two different honeycomb cell patterns of different diameter cells.

The honeycomb support structure may also be formed from two different honeycomb cell patterns as illustrated in FIG. 4. For ease of understanding the constrained layer damper is not shown in this FIG.

The honeycomb support structure 200 has a first section 202 of large diameter hexagonal cells 204 and a second section 206 of small diameter hexagonal cells 208. Each section 202 and 206 supports different elements of the raster output scanning system 210 and has a different density of hexagonal cells. The first section 202 supports the motor 212 and the rotating polygon mirror 214. The second section 206 supports the optical components including fold mirrors 216 and 218, f-theta scan lens 220 and wobble correction mirror 222. The first section supports the heavier ROS components and the ROS components that produce vibrations. The second section supports the lighter weight stationary ROS components. The first section has to be structurally stronger that the second section. The two sections have different diameter and different densities to the same hexagonal shape honeycomb cells.

Altering the regularity of the honeycomb pattern in the support structure by providing two different diameter cells helps avoid sympathetic vibration from the honeycomb structure.

Rather than two different diameter hexagonal cells, the honeycomb structure could have hexagonal cells with thicker walls under the heavier ROS components and thinner hexagonal cell walls under the lighter ROS components.

Figure 5:
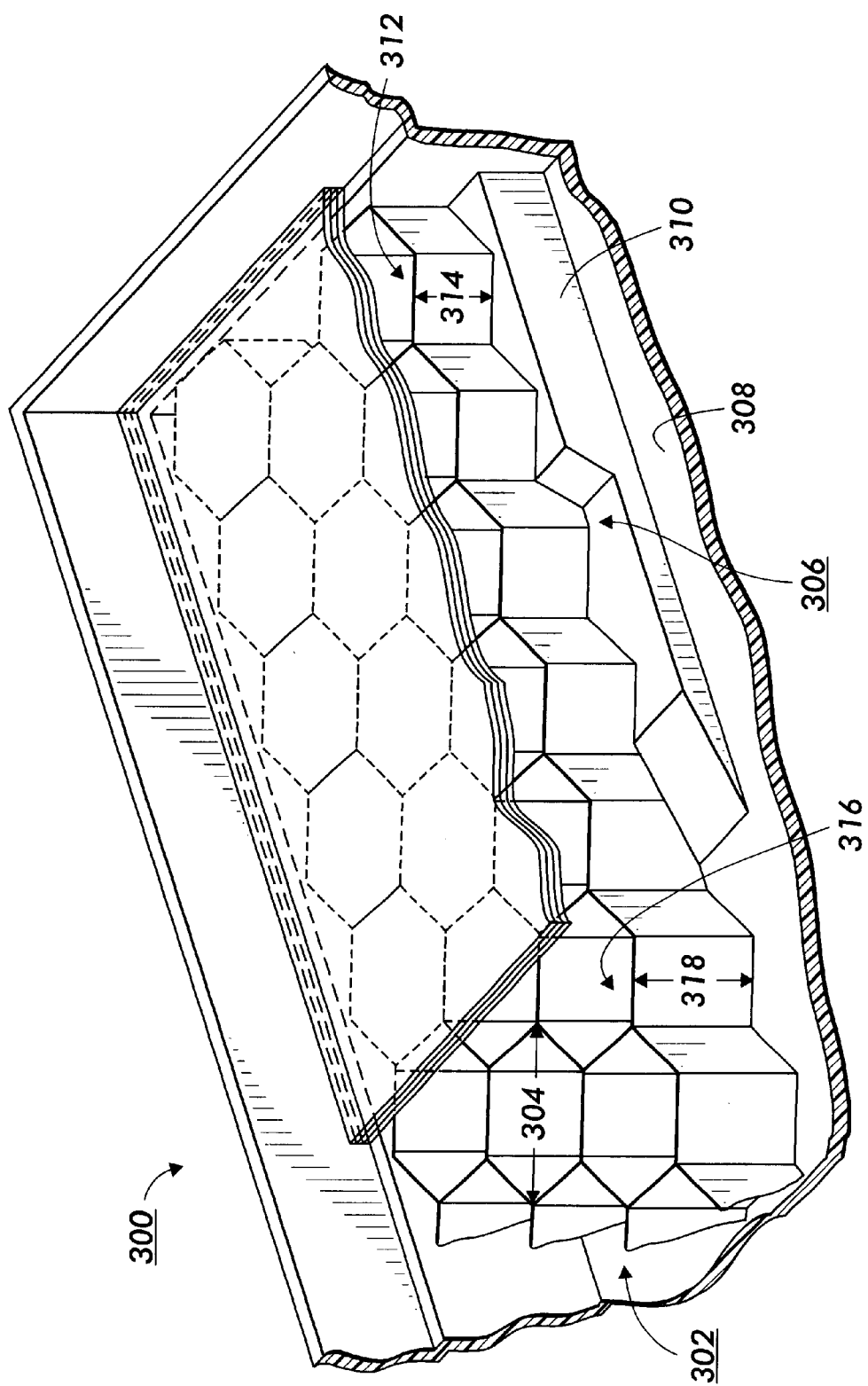
FIG. 5 is a side view of a honeycomb support structure with two different honeycomb cell patterns of different cell wall heights.

Alternately, as shown in FIG. 5, the honeycomb structure 300 has regular hexagonal cells 302 with the same diameter 304 but with varying cell wall heights 306. The housing bottom surface 308 that forms the bottom plate of the honeycomb structure 300 can be angled with an irregular shape 310 to provide the varying cell wall heights 306. Lighter ROS elements would be mounted over the honeycomb cells 312 with the shorter heights 314 while heavier ROS elements would be mounted over the honeycomb cells 316 with large heights 318.

Figure 6:
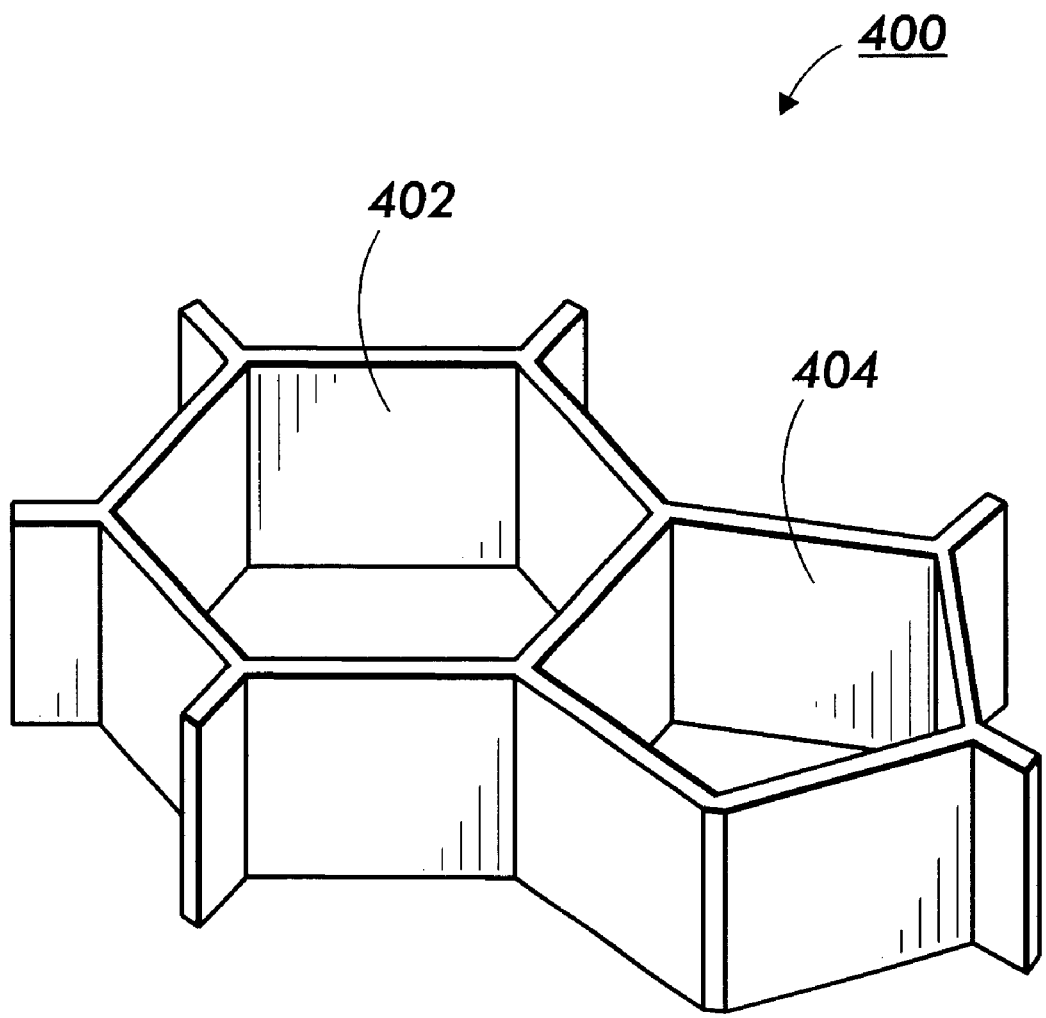
FIG. 6 is a side view of a honeycomb support structure with two different honeycomb cell patterns of different shaped cells.

The honeycomb structure also may be formed by plural interconnected irregular polygons, or plural interconnected regular and irregular polygons, which also is illustrated in FIG. 6. The honeycomb structure 400 has hexagon cells 402 connected to pentagon cells 404. Once again, different patterns provide different weight bearings and reduce sympathetic vibrations.

"Regular" refers to a polygon wherein (1) the angles defined by the intersecting sides are substantially equal, and (2) the lengths of each side of the polygon are substantially equal. An "irregular polygon" refers to a polygon having angles that are not equal, and/or wherein the lengths of the sides of the polygon are not equal. The honeycomb structure also may be formed by interconnecting two or more polygons having different shapes, such as a structure that includes hexagons connected to pentagons, as illustrated in FIG. 6. Thus, "honeycomb" refers to plural, interconnected regular and/or irregular polygons that extend upwardly from the housing base.

The support and vibration damping structure for a raster optical scanning (ROS) system of the present invention forms a honeycomb support structure integral with the ROS housing. A constrained layer damper is bonded to the honeycomb structure to reduce vibrations to the ROS. The top plate of the honeycomb support structure is the bottom structural layer of the vibration damping constrained layer damper.

The honeycomb structure provides a very rigid ROS base for meeting the extreme pixel position stability requirements of high performance printers. The support and damping structure is inexpensive to manufacture and does not require additional machining operations to the casting.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. An optical scanner support and vibration damping apparatus comprising a housing;

a honeycomb structure in said housing for supporting an optical scanner, said honeycomb structure and said housing being metal, said honeycomb structure being cast integral with said housing; and a constrained layer damper on said honeycomb structure for vibration damping said optical scanner, said optical scanner being positioned on said constrained layer damper.

2. An optical scanner support and vibration damping apparatus comprising a housing;

a honeycomb structure in said housing for supporting an optical scanner, said honeycomb structure being formed integral with said housing; and a constrained layer damper on said honeycomb structure for vibration damping said optical scanner, said constrained layer damper having a structural layer, a viscoelastic layer and a constrained layer, said structural layer forming the top plate of said honeycomb structure, said optical scanner being positioned on structural layer of said constrained layer damper.

3. An optical scanner support and vibration damping apparatus comprising a housing;

a honeycomb structure in said housing for supporting an optical scanner, said honeycomb structure being formed integral with said housing, wherein the honeycomb cells of said honeycomb structure have at least a first pattern and a second pattern, said first pattern being different from said second pattern; and a constrained layer damper on said honeycomb structure for vibration damping said optical scanner, said optical scanner being positioned on said constrained layer damper.

4. The optical scanner support and vibration damping apparatus of claim 3 wherein said first pattern of said honeycomb cells of said honeycomb structure has smaller diameter walls for said honeycomb cells than said second pattern of said honeycomb cells of said honeycomb structure.

5. The optical scanner support and vibration damping apparatus of claim 3 wherein said first pattern of said honeycomb cells of said honeycomb structure has smaller height walls for said honeycomb cells than said second pattern of said honeycomb cells of said honeycomb structure.

6. The optical scanner support and vibration damping apparatus of claim 3 wherein said first pattern of said honeycomb cells of said honeycomb structure has thicker walls for said honeycomb cells than said second pattern of said honeycomb cells of said honeycomb structure.

7. The optical scanner support and vibration damping apparatus of claim 3 wherein said first pattern of said honeycomb cells of said honeycomb structure have different shape walls for said honeycomb cells than said second pattern of said honeycomb cells of said honeycomb structure.

8. The optical scanner support and vibration damping apparatus of claim 3 wherein said first pattern and said second pattern of said honeycomb cells of said honeycomb structure are different under different weights of the components of said optical scanner.

9. An optical scanner support and vibration damping apparatus comprising a housing;

a honeycomb structure in said housing for supporting an optical scanner, said honeycomb structure formed integral with said housing; and a constrained layer damper on said honeycomb structure for vibration damping said optical scanner, said constrained layer damper has a structural layer, a viscoelastic layer and a constrained layer, said structural layer forming the top plate of said honeycomb structure, said optical scanner being positioned on said constrained layer damper.

10. The optical scanner support and vibration damping apparatus of claim 9 wherein said honeycomb structure and said housing are metal and said honeycomb structure is cast integral with said housing.

* * * * *